United States Patent
Ahn et al.

(10) Patent No.: US 10,376,794 B2
(45) Date of Patent: Aug. 13, 2019

(54) METHOD OF PROVIDING OBSERVING SERVICE USING EVENT PREDICTION IN GAME

(71) Applicant: MINKONET CORPORATION, Seoul (KR)

(72) Inventors: Sanghyuk Ahn, Seoul (KR); Tae Woo Kim, Gyeonggi-Do (KR); Dong Hwal Lee, Seoul (KR)

(73) Assignee: MINKONET CORPORATION, Seoul (KR)

( * ) Notice: Subject to any disclaimer, the term of this patent is extended or adjusted under 35 U.S.C. 154(b) by 0 days.

(21) Appl. No.: 15/247,924

(22) Filed: Aug. 26, 2016

(65) Prior Publication Data

US 2018/0056187 A1    Mar. 1, 2018

(51) Int. Cl.
| | |
|---|---|
| *A63F 9/00* | (2006.01) |
| *A63F 13/86* | (2014.01) |
| *A63F 13/5252* | (2014.01) |
| *A63F 13/837* | (2014.01) |
| *A63F 13/35* | (2014.01) |

(52) U.S. Cl.
CPC .......... *A63F 13/86* (2014.09); *A63F 13/5252* (2014.09); *A63F 13/35* (2014.09); *A63F 13/837* (2014.09)

(58) Field of Classification Search
None
See application file for complete search history.

(56) References Cited

U.S. PATENT DOCUMENTS

| | | | | |
|---|---|---|---|---|
| 6,155,926 | A * | 12/2000 | Miyamoto | A63F 13/02 463/32 |
| 6,283,857 | B1 * | 9/2001 | Miyamoto | A63F 13/06 463/31 |
| 9,868,052 | B1 * | 1/2018 | Koh | A63F 9/24 |
| 2004/0219980 | A1 * | 11/2004 | Bassett | A63F 13/10 463/33 |
| 2008/0096622 | A1 | 4/2008 | Terada | |
| 2010/0099482 | A1 * | 4/2010 | O'Connor | G07F 17/3211 463/20 |
| 2012/0229445 | A1 * | 9/2012 | Jenkins | G06T 15/60 345/418 |
| 2012/0299940 | A1 * | 11/2012 | Dietrich, Jr. | A63F 13/358 345/522 |
| 2012/0307011 | A1 * | 12/2012 | Shikata | A63F 13/5258 348/46 |

(Continued)

FOREIGN PATENT DOCUMENTS

| | | | | |
|---|---|---|---|---|
| EP | 1138358 | A1 * | 10/2001 | A63F 13/10 |
| JP | H10216357 | | 8/1998 | |

(Continued)

*Primary Examiner* — Seng Heng Lim
(74) *Attorney, Agent, or Firm* — JCIPRNET

(57) ABSTRACT

Provided is a method of providing an observing service using event prediction in a game, in which a method of predicting various events that may occur in a game space during a game play so as to observe a situation where the events are occurring is provided.
According to the method of providing an observing service using event prediction in a game, various game events occurring during a game play may be predicted so as to effectively generate videos of the events.

7 Claims, 1 Drawing Sheet

(56) References Cited

U.S. PATENT DOCUMENTS

| | | | |
|---|---|---|---|
| 2013/0066448 A1* | 3/2013 | Alonso | H04Q 9/00 700/91 |
| 2014/0364974 A1* | 12/2014 | Wohl | G06K 7/10227 700/91 |
| 2015/0119139 A1* | 4/2015 | Ladell | G06T 11/40 463/31 |
| 2015/0375083 A1* | 12/2015 | Stelfox | A61B 5/1113 700/91 |
| 2016/0049173 A1* | 2/2016 | Anderson | G11B 27/10 386/241 |
| 2016/0155260 A1* | 6/2016 | Jenkins | G06T 15/20 345/419 |
| 2016/0275376 A1* | 9/2016 | Kant | G06K 9/6277 |
| 2017/0045941 A1* | 2/2017 | Tokubo | G06F 3/167 |
| 2017/0098122 A1* | 4/2017 | el Kaliouby | A61B 5/744 |

FOREIGN PATENT DOCUMENTS

| | | |
|---|---|---|
| KR | 20000059204 | 10/2000 |
| KR | 20030066180 | 8/2003 |
| KR | 20060129983 | 12/2006 |
| KR | 20080035287 | 4/2008 |
| KR | 100932675 | 12/2009 |
| KR | 20100137792 | 12/2010 |
| KR | 20110081400 | 7/2011 |
| KR | 101139498 | 5/2012 |
| KR | 101353531 | 1/2014 |
| KR | 101604250 | 3/2016 |
| KR | 101643102 | 8/2016 |
| KR | 101644496 | 8/2016 |
| KR | 20160096019 | 8/2016 |

\* cited by examiner

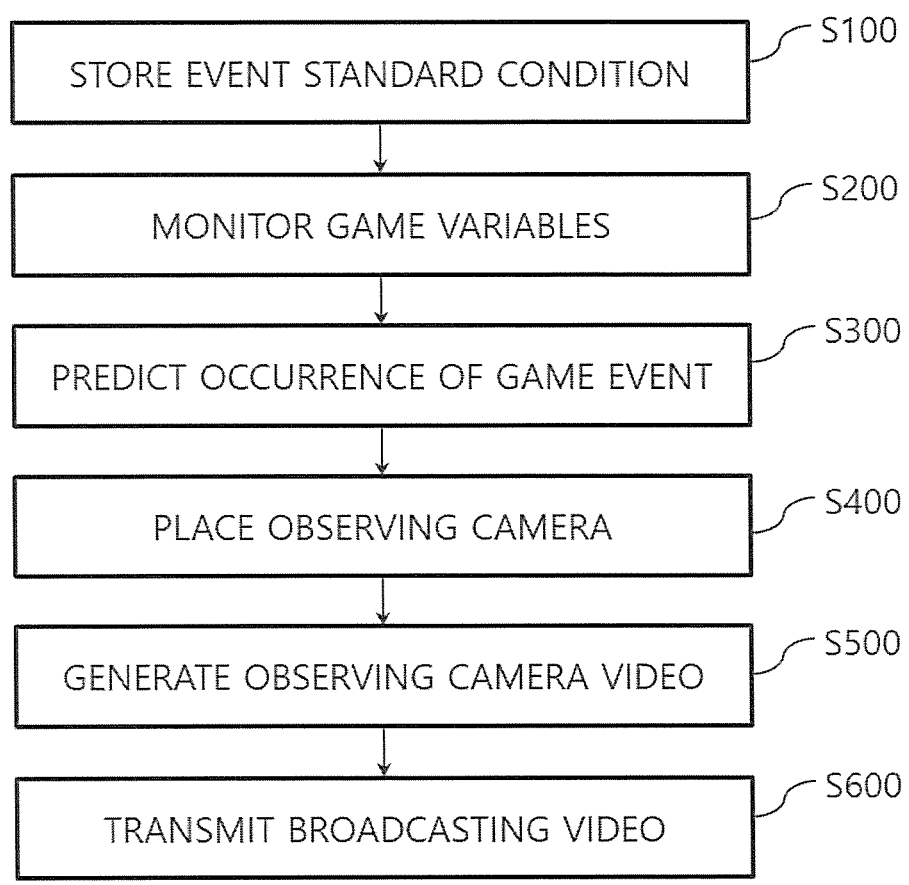

METHOD OF PROVIDING OBSERVING SERVICE USING EVENT PREDICTION IN GAME

TECHNICAL FIELD

The present disclosure relates to a method of providing an observing service using event prediction in a game, and more particularly, to a method of providing an observing service using event prediction in a game, in which a method of predicting various events that may occur in a game space during a game play so as to observe a situation where the events are occurring is provided.

BACKGROUND ART

With the growing number of game users, the number of users watching game play videos through the Internet or broadcasting is also increasing.

In addition, game play situations are increasingly broadcast in real time via online networks, and game plays are also frequently carried live on public television programs.

As the game industry has developed, content of games has become complicated, and graphics of games are often fast-moving videos.

When a game play is progressed according to quick control and quick screen changes, it is often difficult for a third party, who observes the game, to understand the progress of the game even by watching the same videos displayed on a game terminal of a game player playing the game. In addition, if a game is progressed all at once at multiple points in a virtual game space, it is frequently the case that the overall game progress is hard to grasp just from videos displayed on a game terminal of a game player.

In addition, also when a game event such as a death of a crucial game character or an explosion of an important game item occurs, if a progressing speed of the game is fast, a third party may have difficulty in effectively observing the game situation.

In particular, on the side of broadcasting providers relaying a game situation, it may be difficult to promptly prepare and provide videos of game events of a game that is progressing very fast.

DESCRIPTION OF THE INVENTION

Provided is a method of providing an observing service using event prediction in a game, in which a game event during a game play is predicted to generate a video with which a situation of the event may be easily observed.

According to an aspect of the present invention, there is provided a method of providing an observing service using event prediction in a game, the method comprising: (a) storing an event standard condition of game variables indicating states of game objects, based on which occurrence of a game event is predicted; (b) monitoring values of game variables of the game objects during a play of the game on a game terminal; (c) predicting occurrence of the game event by determining whether values of the game variables monitored in (b) satisfy the event standard condition stored in (a); (d) when occurrence of the game event is predicted in (c), placing an observing camera that captures a video of a location in game space where the game event is predicted to occur; and (e) generating a video captured using the observing camera and storing the video.

According to the method of providing an observing service using event prediction in a game of the present invention, various game events occurring during a game play are predicted so as to effectively generate videos showing the events.

BRIEF DESCRIPTION OF THE DRAWINGS

FIG. 1 is a flowchart of a method of providing an observing service using event prediction in a game, according to an embodiment of the present invention.

DETAILED DESCRIPTION OF THE INVENTION

Hereinafter, a method of providing an observing service using event prediction in a game according to the present invention will be described more fully with reference to the attached drawing.

FIG. 1 is a flowchart of a method of providing an observing service using event prediction in a game, according to an embodiment of the present invention.

The method of providing an observing service using event prediction in a game according to the present invention is used in observing a game play situation based on game play data or when transmitting a game play situation as broadcasting videos.

The present invention is used in observing a game play situation of games developed using, for example, Unity3D whereby a game is developed by defining movement of objects appearing in a game, such as things, characters, and backgrounds.

The present invention provides a method of observing game events occurring during a game play in a virtual game space in a convenient and effective manner.

The method of providing an observing service using event prediction in a game according to the present invention may be performed on a game terminal, on which a game is being played, or on a game server for on-line games. According to circumstances, specific steps of the method of providing an observing service using event prediction in a game according to the present invention may be separately performed on a server and a game terminal.

The method of providing an observing service using event prediction in a game according to the present invention may be applied to various types of games such as a sports game, a strategy simulation game, or a shooting game. Hereinafter, description will focus on a first person shooting (FPS) game.

In order to perform the method of providing an observing service using event prediction in a game, first, a game server stores event standard conditions of game variables indicating states of game objects, based on which occurrence of a game event may be predicted, in step (a) (S100).

Examples of the game objects may be a game character, a weapon appearing in a game, or an object appearing in the game.

Examples of game variables may be a remaining energy level of a game character, a movement of the game character, a remaining energy of a weapon appearing in a game, a position of the game character in game space, and a remaining time period until explosion of a time bomb appearing in the game. In addition, a power of the game character, a posture of the game character, a distance from the game character to a weapon, or an explosion time of a bomb in the game may also be game variables.

A game event refers to a critical change in a situation occurring in a game. Examples of the game event may be a death of a game character or explosion of a time bomb.

An event standard condition refers to conditions of game variables based on which occurrence of a game event may be predicted. That is, examples of the event standard condition are a condition in which a death of a game character is predicted or a condition in which an explosion of a vehicle in game space is predicted.

The event standard condition may be received from a service provider via an input device to be stored, or a predetermined event standard condition may be set by analyzing game data. For example, 95% of energy consumption of a game character may be received as an event standard condition and stored on a game terminal or a game server.

In regard to the method of providing an observing service using event prediction in a game of the present embodiment, a step in which an event standard condition is set and stored as follows will be described as an example.

First, the game terminal collects and stores states of game objects being played on a game terminal and data on whether a game event has occurred, in step (a-1). That is, basic data for predicting occurrence of a game event is collected. Step (a-1) may be performed using the game terminal, or data about states of game objects and whether a game event occurs may be received from the game terminal to be stored on the game server. In online network games, a game server may collect and store such basic data described above.

Next, in step (a-2), the game server sets and stores an event standard condition based on which occurrence of a game event may be predicted, by statistically processing the data stored in step (a-1). The game server processes the data collected in step (a-1) by using various statistical methods to set an event standard condition for predicting occurrence of a game event.

For example, the game server may calculate a probability that a game event corresponding to each game variable may occur, based on the data collected in step (a-1). The game server may perform step (a-2) by calculating a condition, in which the probability of the game event is higher than 85%, and setting and storing this condition as an event standard condition.

Alternatively, the game server may calculate and use a value of a game variable (the most frequent value; mode), with which a game event occurred most frequently. The game server may perform step (a-2) by calculating the most frequent value (mode) of a game variable, with which a game event occurs, based on the data stored in step (a-1), and setting and storing values within a margin of error of 20% of the most frequent value of the game variable, as an event standard condition.

Furthermore, other various statistical techniques of predicting an event may also be used other than the above method.

The event standard condition may be set to various values according to types of game objects and game variables. For example, a game character staying 10 seconds or longer within a range of the opponent's weapon may be set as an event standard condition. In addition, if a game character stays two seconds or longer in an area of a predetermined game space and a probability that the game character will die is 95% or higher, this may be set as an event standard condition. In addition, a game event arising when a game character maintains a predetermined posture for several seconds or longer may be set as an event standard condition.

Next, the game server monitors values of game variables of game objects during a game play in step (b) (step S200). The game server monitors the values of the game variable to determine whether the event standard condition set in step (a) is satisfied. Step (b) may be performed by a game terminal or may be performed by an additional server or a game server that receives game variables from the game terminal.

If the values of the game variables monitored in step (b) satisfy the event standard condition set in step (a), in step (c) (step S300), the game server predicts that a game event is to occur.

When a game event is predicted in step (c), the game server places an observing camera in the game space to capture a video of a location in the game space where the game event is predicted to occur, in step (d) (step S400). The observing camera (a virtual camera of game space) is placed at a location to capture a video of a point where a game character is predicted to die or a location where a bomb explosion in game space may be viewed. A method of placing an observing camera may be set using various methods in advance. An observing camera may be placed a preset distance away from a point in game space where a game event is predicted to occur so as to face the point, or in a location where a top view of a game event predicted to occur may be taken. An observing camera may be placed in various manners based on game types, types of game objects, and types of game variables.

Next, the game server generates a video captured using the observing camera and stores the video in step (e). The video captured using the observing camera may be used in real time, and thus may be stored in a streaming video format or in a format that may be simultaneously through multiple channels.

The video of the observing camera stored as above may be used for various uses. For example, most frequently, the video may be used in live broadcast of a game play situation. In a game live broadcast, the game server transmits the video generated in step (d) in a broadcasting format in step (f) (S600). The video of the observing camera may be broadcast through various channels such as an online network, cable television broadcasting or public television broadcasting. Steps (e) and (f) may also be performed by another broadcasting server by receiving relevant data from the game server.

In particular, the present invention may be effectively used in real-time live broadcast of a game play situation. A game situation may be provided to viewers through multiple channels, and when an observing video is provided through one of the multiple channels, viewers may check and watch a progress of the game from diverse angles. In addition, when relaying a game play through one channel, a server that provides a live game broadcast service may predict occurrence of game events and change beforehand to a screen with videos obtained using the observing camera. Accordingly, instead of replaying the video or viewing edited videos later, the viewers may check important game events in real time when watching the game play broadcasting. By providing such game broadcasting, exposure effects of a game broadcasting may be further enhanced, generating interest of viewers in the broadcasting and increasing their satisfaction with the broadcasting. In addition, according to the method of providing an observing service using event prediction in a game of the present invention, differently from the related art, game videos captured from multiple angles may be provided, thereby improving a quality of game broadcasting.

While the present invention has been described with reference to preferred embodiments above, the scope of the present invention is not limited to the embodiments described and illustrated above.

For example, while the above-described method is described as including step (f) of transmitting an observing camera video in a broadcasting format, the method of providing an observing service using event prediction in a game according to the present invention may not include step (f). The observing video generated in step (e) may be used for various purposes. For example, a game player may check an observing video of a game event occurring at multiple points in game space during a game play, on a display device of a game terminal. In this case, a plurality of display devices may be mounted on the game terminal to display observing videos, or the display device of the game terminal may be split into multiple windows to display observing videos on some of the windows. In this case, the game player may play a game while checking a game event occurring at multiple points of game space in real time.

In addition, step (e) of collecting data on whether a game event occurs and storing the data and setting an event standard condition by statistically processing the data may be modified in various manners. Game data may be cumulatively stored during a game play conducted on a game terminal, and an algorithm that learns based on the data may be used to set an event standard condition. Alternatively, in the case of a game played via a game server accessed by a large number of game terminals, an event standard condition may be set by the game server by analyzing data on a correlation between game variables and occurrence of events.

While this invention has been particularly shown and described with reference to various embodiments thereof, the present invention should not be construed as being limited to the embodiments set forth herein; various changes, combinations, and modifications may be made therein without departing from the spirit and scope of the present invention as defined by the appended claims.

What is claimed is:

1. A method of providing an observing service using event prediction in an online game, the method comprising:
   (a) storing, by a game terminal or a server, an event standard condition of game variables indicating states of game objects, based on which occurrence of a game event is predicted, wherein the event standard condition stores a particular value of each of the game variables predetermined to be associate to the game event by statistically processing past game data during the occurrence of the game event;
   (b) monitoring, by the game terminal or the server, values of game variables of the game objects during a play of the online game on the game terminal;
   (c) predicting, by the game terminal or the server, occurrence of the game event by determining whether values of the game variables monitored in (b) satisfy the event standard condition stored in (a), wherein the game event is an event change in an environment of the online game;
   (d) when occurrence of the game event is predicted in (c), placing, by the game terminal or the server, a virtual observing camera that captures a video at a first location in virtual game space is moved to a second location in virtual game space where the game event is predicted to occur, wherein the first and second locations of the virtual observing camera have different viewing angle with respect to the predicted occurrence of the game event; and
   (e) generating, by the game terminal or the server, a video captured using the virtual observing camera and storing the video.

2. The method of claim 1, wherein (a) comprises:
   (a-1) collecting, by the game terminal or the server, data on the states of the game objects played on the game terminal and on the game variables of various game objects corresponding to the occurrence of the game event and storing the data; and
   (a-2) statistically processing, by the game terminal or the server, the data stored in (a-1) to set and store the particular value of the game variables corresponding to each of the game objects as the event standard condition corresponding to the occurrence of the game event, and based on which occurrence of the game event is predicted.

3. The method of claim 2, wherein in (a-2), the most frequent value of the game variable, with which the game event occurs, is calculated based on the data stored in (a-1), and values within a margin of error of 20% of the most frequent value are set and stored as the particular value of the game variable of the event standard condition.

4. The method of claim 2, wherein in (a-2), a probability that the game event occurs is calculated based on the data stored in (a-1), and a condition, in which the probability of the game event is higher than 85%, is set and stored as the event standard condition.

5. The method of claim 1, wherein the game variable is at least one of a power of a game character, a position of the game character in game space, a posture of the game character, a distance of the game character with respect to a weapon, and an explosion time of a bomb in the game.

6. The method of claim 1, further comprising (f) transmitting, by the game terminal or the server, the video generated in (e), in a broadcasting format.

7. The method of claim 1, wherein the game objects comprise a first object and a second object, and the step (c) predicts the occurrence of the game event by determining whether the values of the game variables of the first and second objects satisfy the particular value of each of the game variables stored in the event standard condition for each of the first and second objects.

* * * * *